US008897764B2

(12) United States Patent
Takikawa

(10) Patent No.: US 8,897,764 B2
(45) Date of Patent: Nov. 25, 2014

(54) VEHICLE ON-BOARD UNIT AND MOBILE DEVICE LINKAGE SYSTEM

(71) Applicant: Honda Access Corp., Niiza (JP)

(72) Inventor: Keiichi Takikawa, Niiza (JP)

(73) Assignee: Honda Access Corp., Niiza-shi (JP)

(*) Notice: Subject to any disclaimer, the term of this patent is extended or adjusted under 35 U.S.C. 154(b) by 59 days.

(21) Appl. No.: 13/662,603

(22) Filed: Oct. 29, 2012

(65) Prior Publication Data

US 2013/0137415 A1 May 30, 2013

(30) Foreign Application Priority Data

Nov. 30, 2011 (JP) ................................ 2011-262853

(51) Int. Cl.

| | |
|---|---|
| ***H04M 3/00*** | (2006.01) |
| *H04M 11/00* | (2006.01) |
| *H04B 7/00* | (2006.01) |
| *G06F 3/033* | (2013.01) |

(52) U.S. Cl.

USPC ............ 455/418; 455/403; 455/517; 345/157

(58) Field of Classification Search

USPC .......................................................... 455/418

See application file for complete search history.

(56) References Cited

U.S. PATENT DOCUMENTS

| | | | | |
|---|---|---|---|---|
| 8,244,307 | B1 * | 8/2012 | Tilgner et al. | 455/569.1 |
| 2002/0085043 | A1 * | 7/2002 | Ribak | 345/810 |
| 2002/0197955 | A1 * | 12/2002 | Witkowski et al. | 455/41 |
| 2003/0085819 | A1 * | 5/2003 | Gustavsson et al. | 340/988 |
| 2005/0003844 | A1 * | 1/2005 | Nishiga et al. | 455/517 |
| 2008/0064360 | A1 * | 3/2008 | Contour et al. | 455/403 |
| 2009/0273563 | A1 * | 11/2009 | Pryor | 345/157 |
| 2009/0284364 | A1 * | 11/2009 | Sawada | 340/461 |
| 2012/0095643 | A1 * | 4/2012 | Bose et al. | 701/32.8 |

FOREIGN PATENT DOCUMENTS

| | | | |
|---|---|---|---|
| JP | 2010-190594 | A | 9/2010 |
| JP | 2010-193187 | A | 9/2010 |
| JP | 2010-250376 | A | 11/2010 |
| JP | 2012-129765 | A | 7/2012 |
| WO | WO 2007/113791 | * | 3/2007 |

OTHER PUBLICATIONS

Japanese Office Action dated Sep. 3, 2013, issued in corresponding Japanese Patent Application No. 2011-262853 with partial translation (6 pages).

* cited by examiner

*Primary Examiner* — Timothy Pham

(74) *Attorney, Agent, or Firm* — Westerman, Hattori, Daniels & Adrian, LLP

(57) ABSTRACT

A system that links a mobile device with a vehicle on-board unit includes a data control section that restricts use of at least one of a plurality of registered application software products provided on the mobile device, and a data output section that outputs an indication representing the at least one registered application software product to a display section of the vehicle on-board unit when the at least one application software product is available according to conditions of the vehicle.

5 Claims, 3 Drawing Sheets

300

50 110 100 210 200

SIGNAL
Bluetooth
100
110
120
121
122
123
124
125
130
140
NAVI
MAP
TRAFFIC INFO
TEL
SEARCH
A
B
C
200
210
220
221
222
223
224
225
230
240

SIGNAL
WiFi
100
110
120
131
132
133
134
130
140
MOVIES
PHOTO
TV
MUSIC
A
B
C
200
210
220
231
232
233
234
230
240

VEHICLE ON-BOARD UNIT AND MOBILE DEVICE LINKAGE SYSTEM

FIELD OF THE INVENTION

The present invention relates to a system that links a vehicle on-board unit and a mobile device.

BACKGROUND OF THE INVENTION

A system that links a mobile device with a vehicle on-board unit has been proposed as an information service system disclosed in Japanese Patent Application Laid-open Publication (JP-A) No. 2010-250376. In the information service system, a display mode to be displayed on a display part of a vehicle on-board unit is specified previously, a mobile device acquires content data and converts the acquired content data into the previously specified display mode, and the vehicle on-board unit displays the converted content data on its display part. This arrangement is advantageous in that the vehicle on-board unit does not have to have the same on-board browser as the mobile device.

The mobile device such as mobile phone can be used with various application software products (hereinafter referred to, for brevity, as "applications"), however, for some sort of applications, execution is not desirable while the vehicle is moving or in motion.

SUMMARY OF THE INVENTION

It is, therefore, an object of the present invention to provide a system that links a vehicle on-board unit with a mobile device without hindering safe driving the vehicle.

According to the present invention, there is provided a vehicle on-board unit and mobile device linkage system, comprising: an on-board unit installed in a vehicle, the on-board unit having a display section; a mobile device having a plurality of application software products registered therein; a data control section that restricts use of at least one of the plurality of registered application software products; and a data output section that outputs an indication representing the at least one registered application software product to the display section of the on-board unit when the at least one registered application software product is available according to conditions of the vehicle With this arrangement, since the data control section restricts use of at least one of a plurality of registered application software products, it is possible to selectively place the application software products in an available state according to conditions of the vehicle. Furthermore, since the data output section outputs an indication representing each respective available registered application software product to the display section of the vehicle on-board unit, an indication representing an unavailable registered application software product does not come into driver's attention. The driver is allowed to concentrate on continuing driving operation, which will lead to safe driving of the vehicle.

Preferably, the vehicle on-board unit and mobile device linkage system further comprises a vehicle travel determining section that determines as to whether the vehicle is in motion or in park, wherein the at least one registered application software product includes a first registered application software product which is available while the vehicle is in motion, and a second registered application software product which is available while the vehicle is in park, and wherein when the data output section outputs the indication of the at least one registered application software product to the display section of the on-board unit, the data output section automatically switches between a first screen on which the first registered application software product is displayed and a second screen on which the second registered application software product is displayed, based on a determination made by the vehicle travel determining section.

By virtue of the vehicle travel determining section, the data output section can automatically switch between the first screen and the second screen. This arrangement makes the driver freer from a laborious manual operation required to switch the screens and allows the driver to concentrate on continuing safe driving of the vehicle.

In one preferred form of the present invention, the vehicle travel determining section uses information from a parking brake of the vehicle in order to determine conditions of the vehicle. By thus using information from the parking brake, the vehicle travel determining section can surely determine a moving state of the vehicle.

Preferably, the first registered application software product which is available while the vehicle is in motion is such an application software product which is capable of recognizing a voice-activation command from a driver of the vehicle. This arrangement allows the driver to activate the first registered application software product by voice and provides a substantive reduction in driving operation loads on the driver, leading to highly safe driving of the vehicle.

BRIEF DESCRIPTION OF THE DRAWINGS

One preferred structural embodiment of the present invention will be described in detail herein below, by way of example only, with reference to the accompanying sheets of drawings, in which.

DESCRIPTION OF THE PREFERRED EMBODIMENT

Figure 1:
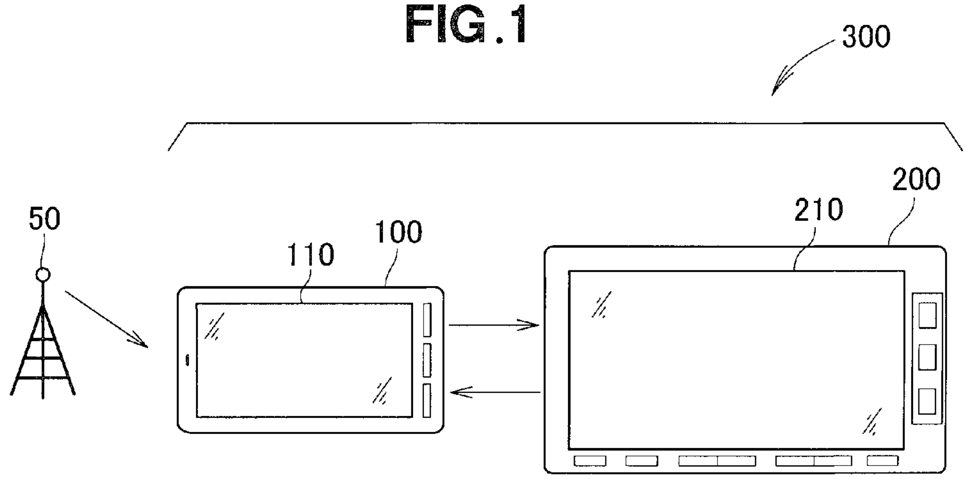
FIG. 1 is a diagrammatical view showing a general configuration of a vehicle on-board unit and mobile device linkage system according to one embodiment of the present invention.

Referring now to the drawings and FIG. 1 in particular, there is shown a general configuration of a vehicle on-board unit and mobile device linkage system according to an embodiment of the present invention. As shown in FIG. 1, the system 300 generally comprises a mobile device 100 and a vehicle on-board unit 200 that can be linked with each other. More particularly, the mobile device 100 serves as a controller or master, while the vehicle on-board unit 200 serves as an external monitor or slave. The vehicle on-board unit 200 has a display section 210 that can be controlled by executing an application provided on the mobile device 100. In the embodiment shown in FIG. 1, an image shown on a screen of the display section 210 of the vehicle on-board unit 200 represents an image shown on a screen of a display section 110 of the mobile device 100. When the display section 210 is larger in size or pixel density than the display section 110, the image shown on the screen of the display section 110 of the mobile device 100 is enlarged on the side of the display section 210.

In the embodiment shown in FIG. 1, the mobile device 15 is a mobile phone unit (so-called "smartphone", for example) which is linkable with the vehicle on-board unit 200. The mobile device (mobile phone unit) 100 can communicate with a mobile telephone network (and Internet) via a base station 50, for example. The mobile device 100 does not have to be connectable with the mobile telephone network and may include a portable tablet personal computer, a personal digital assistant (PDA) and another type of portable personal computer. The vehicle on-board unit 200 may include a monitor unit, audio unit, navigation unit and the like. The vehicle on-board unit 200 is installed in a vehicle such as automobile (not shown) and has a display section 210. While the vehicle on-board unit 200 and the mobile device 100 are linked together, the display section 210 of the vehicle on-board unit 200 serves as an external monitor of the mobile device 100.

Figure 2:
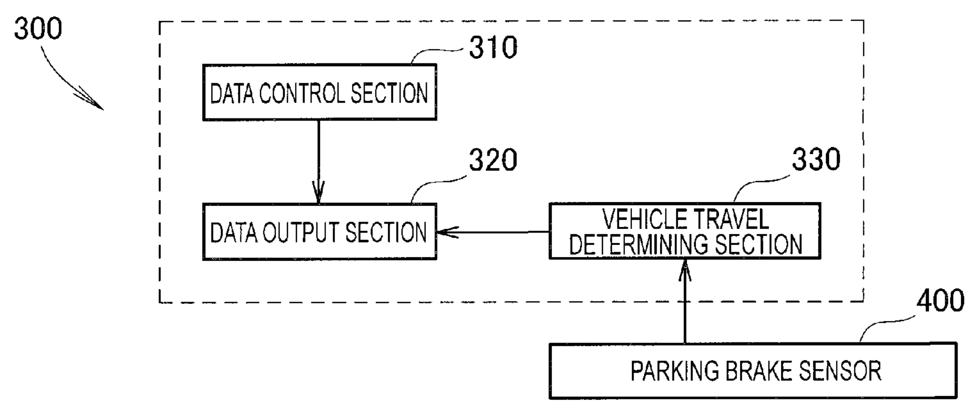
FIG. 2 is a schematic functional block diagram of the system.

FIG. 2 shows in functional block diagram the general configuration of the system 300. As shown in this figure, the system 300 comprises a data control section 310 and a data output section 320. The system 300 may further include a vehicle travel determining section 330. Though not shown in FIG. 2, the system 300 may further include another functional section to achieve any desired function where appropriate.

In case where the mobile device 100 has a plurality of applications running on an operating system (OS) such as Android, the data control section 310 shown in FIG. 2 can restrict use of some of the plurality of applications. More particularly, the data control section 310 is able to separate and register the plurality of applications depending on their availability while the vehicle is moving or in motion. Especially, the data control section can determine whether or not each individual application corresponds to a predetermined recommended application. With this determination, only those applications, which are determined as corresponding to the predetermined recommended application (and classified in a first group of applications), are registered as non-restricted registered applications that are available while the vehicle is moving or in motion. Other applications, which are determined as not corresponding to the predetermined recommended application (and classified in a second group of applications), are registered as restricted registered applications that are available while the vehicle is in park.

For instance when vehicle is moving or in motion (first case), the data output section 320 shown in FIG. 2 is allowed to output a representation of each one of the non-restricted applications (first group of applications) to the display section 210 of the vehicle on-board unit 200 shown in FIG. 2. At the same time, the data output section 320 does not output a representation of any one of the restricted applications (second group of applications) to the display section 210 of the vehicle on-board unit 200.

The data output section 320 makes the second group of applications unavailable in the first case where the vehicle is actually moving or in motion. Alternatively, the data output section 320 makes the second group of applications available in a second case where the vehicle is actually stopped or in park. In the first case, since the data output section 320 outputs only the representations of the first group of applications to the display section 210 of the vehicle on-board unit 200, it does never occur that the representatives of the second group of applications come into driver's attention. Thus, the driver is allowed to concentrate continued driving operation, which will lead to safe driving of the vehicle. Alternatively, in the second case, the data output section 320 outputs the representatives of the second group of applications to the display unit 210 of the vehicle on-board unit 200, thereby allowing the driver to look at the representatives of the second group of applications on the display section 210 while the vehicle is stopped or in park. In other words, when the safety of the vehicle is assured, the driver is allowed to use the second group of applications.

The vehicle travel determining section 330 determines as to whether or not the vehicle is moving or in motion, by using, for example, information from a parking brake of the vehicle. More particularly, a parking brake sensor 400 is configured to detect activation and deactivation of the parking brake and generate a signal corresponding to the detected activation or deactivation of the parking brake. For instance, when a detection signal from the parking brake sensor 400 is a low-level signal, the vehicle travel determining section 330 determines that the vehicle is moving or in motion. Alternatively, when a detection signal from the parking brake sensor 400 is a high-level signal, the vehicle state determining section 330 determines that the vehicle is not moving or the vehicle is in park. The parking brake is activated, for example, when a parking brake lever is manually pulled by a driver's hand, or alternatively when a parking brake pedal is depressed by a driver's foot. The parking brake is normally disposed in a deactivated state.

Figure 3A:
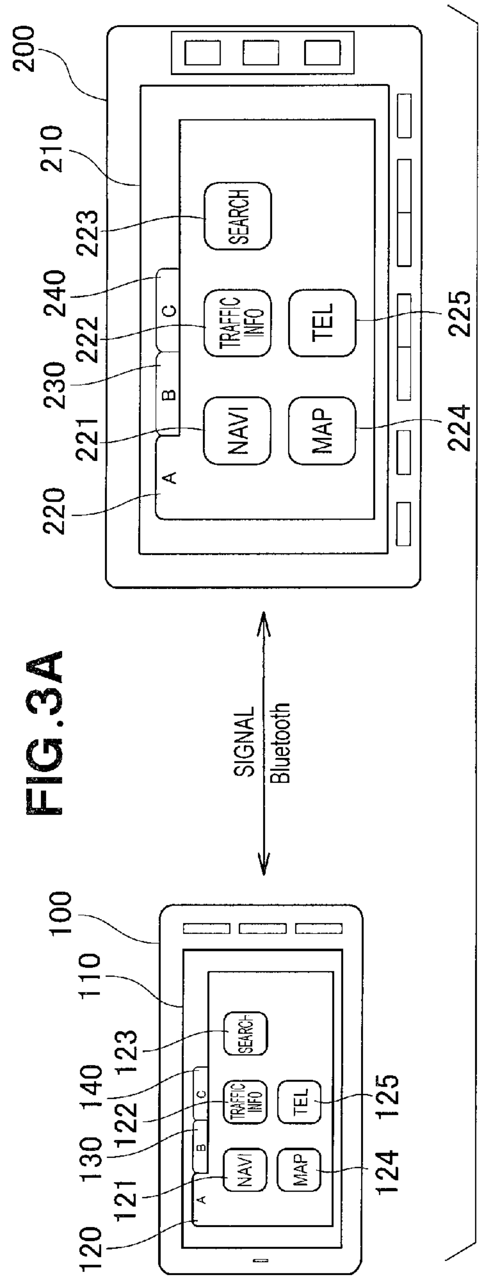
FIG. 3A is a diagrammatical view illustrative of the manner in which a group of applications available while the vehicle is moving or in motion is displayed.
Figure 3B:
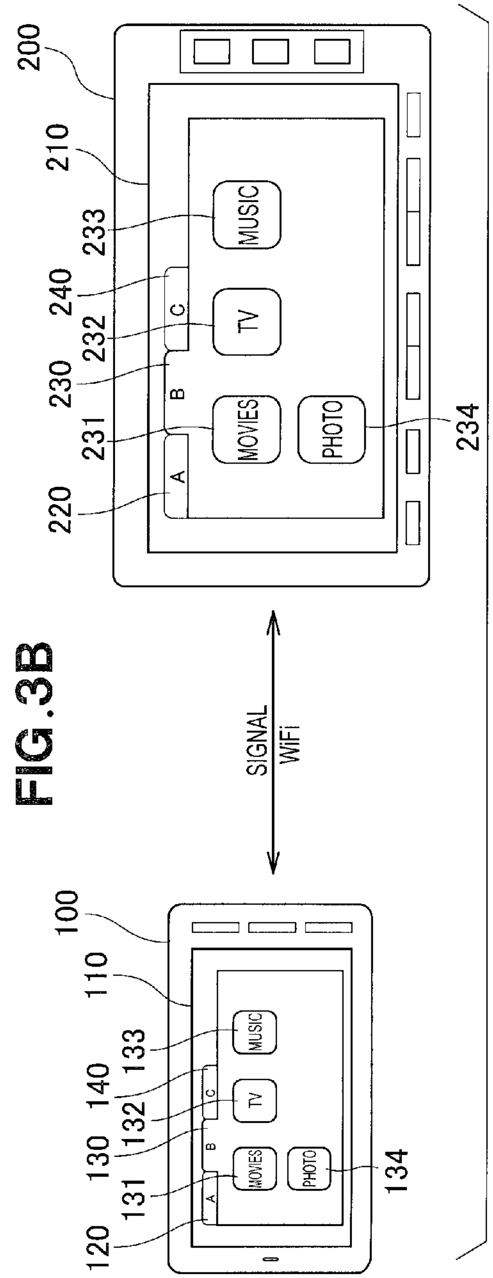
FIG. 3B is a diagrammatical view illustrative of the manner in which a group of applications available while the vehicle is stopped or in park is displayed.

FIG. 3A diagrammatically illustrates the manner in which a group of applications available while the vehicle is moving or in motion is displayed, and FIG. 3B diagrammatically illustrates the manner in which a group of applications available while the vehicle is stopped or in park is displayed. In the example shown in FIG. 3A, while the vehicle on-board unit 200 and the mobile device 100 are linked together, from among a plurality of applications provided on the mobile device 100, a cooperative application (or a tab launcher application) has been executed to control the display sections 110 and 210. The display section 110 of the mobile device 100 shows on its screen an A-tab (first tab) 120, a B-tab (second tab) 130, a C-tab (third tab) 140, and a plurality of registered applications 121, 122, 123, 124 and 125 which has been registered on the A-tab 120. The A-tab (first tab) 120 is a specific tab which is available when the vehicle is moving or in motion. The B-tab (second tab) 130 is a specific tab which is available when the vehicle is stopped or in park. The C-tab (third tab) 140 is an additional tab which is available when the vehicle is stopped or in park.

The tab launcher application transmits a video signal representing a screen of the display section 110 to the vehicle on-board unit 200 through SPP (Serial Port Profile) for Bluetooth communication ("Bluetooth" is a trademark for a wireless technology), so that the display section 210 of the vehicle on-board unit 200 can serve as an external monitor of the mobile device 100. The screen of the display section 110 is zoomed up or enlarged and forms another or external screen of the display section 210. The display section 210 also shows on its screen an A-tab 220, a B-tab 230, a C-tab 240 and a plurality of registered applications 221, 222, 223, 224 and 225, which has been registered on the A-tab 220.

In the illustrated embodiment, the display section 110 and the display section 210 are touch panels. While the vehicle is actually moving or in motion, the tab launcher application allows the driver to select only the A-tab 120 or 220 (specific tabs available while the vehicle is in motion) so that only those icons of the registered applications 121-125 and 221-225 which are shown in FIG. 3A can be displayed. The tab launcher application can receive manual input operation of one or both of the touch panel display sections 110, 210 via Bluetooth HID (Human Interface Device Profile) to thereby realize UMI (User-Machine Interface) control.

Even when the driver manually selects the B-tab 130 or 230 (which is a specific tab available while the vehicle is stopped or in park) while the vehicle is actually moving, the tab launcher application does not allow the display units 110, 210 to display icons of those registered applications 131-134 and 231-233 which are shown in FIG. 3B. Alternatively while the vehicle is actually stopped or in park, the tab launcher application allows the driver to select with its finger the B-tab 130 or 230 so that the icons of the registered applications 131-134 and 231-233 are displayed on the display units 110 and 210, respectively. While the vehicle is stopped or in park, the tab launcher application allows the driver to selectively choose with its finger all of the tabs 120, 130 and 140.

It is desirable that while the vehicle is moving or in motion, the tab launcher application automatically selects only the A-tab 120. In other words, it is desirable that when the vehicle changes from a stopped or parked state to a moving state, the tab launcher application automatically switches from, for example, the B-tab 130 to the A-tab 120. With this arrangement, the driver is freed from manual operation required for switching the B-tab 130 to the A-tab 120. Thus, by automatically determining whether the vehicle is in motion or in park, it is possible to reduce operational loads on the driver. In case where the A-tab 120 is already selected while the vehicle is in park, the tab launcher application may continue to keep the selection of the A-tab 120.

The registered applications 121-125 fall under predetermined recommended applications and are available while the vehicle is moving or in motion. The tab launcher application allows the registered applications 121-125 to be registered on the A-tab 120 (which is available while the vehicle is in motion). In the example shown in FIG. 3A, the registered application 121 is a navigation application which guides the vehicle into a desired destination; the registered application 122 is a traffic information application which provides traffic information including traffic jam-up information; the registered application 123 is a search application which searches information about the desired destination; the registered application 124 is a map application which provides map information; and the registered application 125 is a telephone application which can communicate with a mobile phone network. The registered applications to be registered on the A-tab 120 are also displayed on the display section 210 or in the A-tab 220 of the display section 210.

For example, when the driver selects with its finger the navigation application 121, the navigation application 121 is executed. During running of the navigation application, the display section 110 of the mobile device 100 is directly controlled by the navigation application, while the display section 210 of the vehicle on-board unit 200 is controlled indirectly, for example, by SPP for Bluetooth communication. The navigation application can receive a destination via Bluetooth HID (Human Interface Device Profile) and also can transmit or output a stereo audio signal to the vehicle on-board unit 200 or a speaker connected to the vehicle on-board unit 200 through A2DP (Advanced Audio Distribution Profile) for Bluetooth communication.

When the driver selects with its finger the telephone application, the selected telephone application is executed. During running of the telephone application, the display section 110 is directly controlled by the telephone application, while the display section 210 is controlled indirectly via SPP of Bluetooth communication. The telephone application can receive or input a voice signal from the driver via the vehicle on-board unit 200 or a microphone connected to the vehicle on-board unit 200 through Bluetooth HFP (Hands-Free Profile) and also can transmit or output a voice signal from a caller to the on-board unit 200 or the speaker connected to the on-board unit 200 via Bluetooth HFP. The mobile device 100 may be connected with the vehicle on-board unit 200 via USB (Universal Serial Bus) connection in which instance the mobile device 100 can receive electric power from the on-board unit 200 or a battery connected to the vehicle on-board unit 200.

Preferably, the tab launcher application and the registered applications 121-125 are applications which can recognize voice action commands issued from the driver. In this case, the driver is allowed to operate the registered applications 121-125 by voice while the vehicle is moving so that operation loads on the driver can be reduced. It is also preferable that the registered applications 131-134 can recognize voice action commands issued from the driver.

The registered applications 131-134 do not fall under predetermined recommended applications and are available while the vehicle is stopped or in park. The tab launcher application allows the registered applications to be registered on, for example, the B-tab 130 (which is available while the vehicle is stopped or in park). The mobile device 100 has a capacity to contain many applications and this will allow the driver to sort the registered applications to be registered on the B-tab 130. The C-tab 140 accepts registration of other recorded applications that are available while the vehicle is stopped or in park. In the example shown in FIG. 3B, the registered application 131 is a motion picture application that can play videos on the Internet; the registered application 132 is a TV application that enables TV reception; the registered application 133 is a music application that can replay promotion videos on the mobile device 100; and the registered application 134 is a photo application that can replay picture images like a slide show. The registered applications 131-134 registered on the B-tab 130 are also displayed on the display section 210 or the B-tab 230 of the display section 210.

When the driver selects the TV application 132 with its finger, the selected TV application is executed. While the TV application 132 is running, the display section 110 is directly controlled by the TV application 132, while the display section 210 is indirectly controlled via WiFi (Wireless fidelity), for example. The TV application 132 can receive a desired channel via Bluetooth HID and transmit or output a stereo audio signal to the vehicle on-board unit 200 or the speaker connected to the vehicle on-board unit 200 through A2DP for Bluetooth communication. When a telephone call is received while the TV application is running, the telephone application may be preferentially executed. The telephone application allows the driver to hands-free communicate with a caller via HFP for Bluetooth communication.

Figure 4:
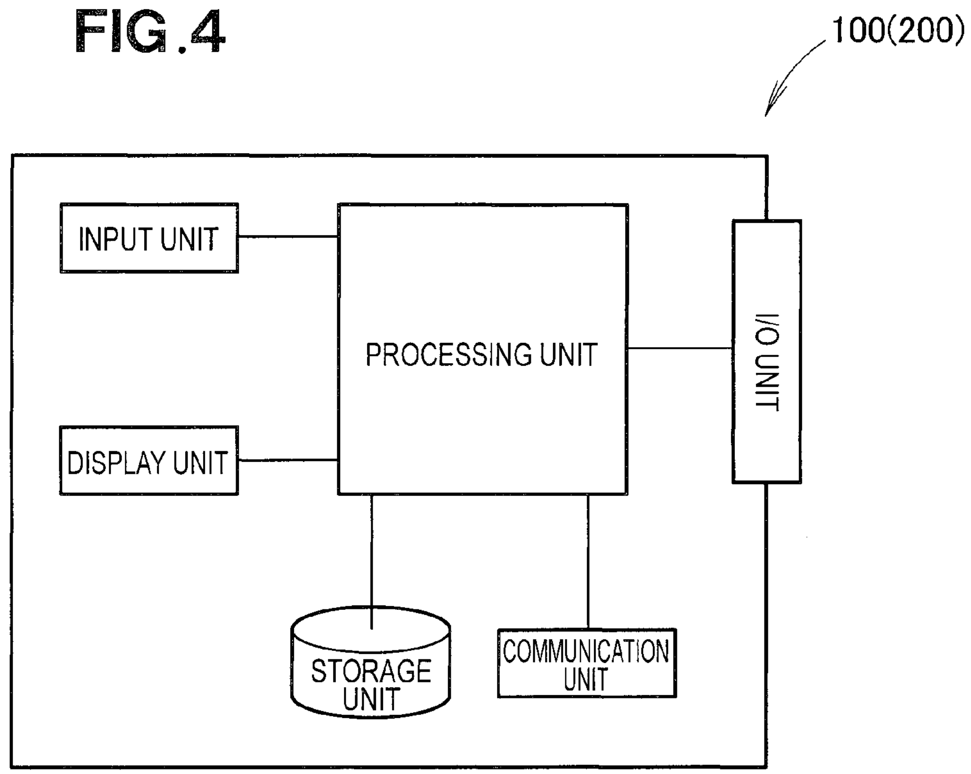
FIG. 4 is a block diagram showing a configuration of hardware of the mobile device shown in FIG. 1.

FIG. 4 is a block diagram showing a configuration of hardware of the mobile device 100 shown in FIG. 1. The vehicle on-board unit 200 shown in FIG. 1 may have the same hardware configuration. The mobile device 100 includes a storage unit, such as a hard disk drive (HDD), flash memory and the like, which can store an OS application and a plurality of applications capable of running on the OS application. The plurality of applications includes the aforesaid tab launcher application and those applications 121-125 and 131-135 which can be registered in the tab launcher application. The applications thus stored in the storage unit can be executed by a processing unit such as a CPU (central processing unit) of a microcomputer. When the tab launcher application is executed, the processing unit of the mobile device 100 operates as the data control section 310 and the data output section 320 shown in FIG. 2.

As shown in FIG. 4, the mobile device 100 further includes an input unit and a display unit. The input unit and the display unit may be formed by a single touch screen display panel module. The mobile device 100 also includes a communication unit, which may be formed by a 3 G communication module, a Bluetooth communication module, or a WiFi communication module. The mobile device 100 further includes an I/O or interface unit, which may be formed by a USB interface module.

The vehicle on-board unit 200 includes a storage unit such a HDD, flash memory and the like. The storage unit is able to store an OS application and at least one application capable of running on the OS application. The storage unit of the vehicle on-board unit 200 can also store information about any one of the predetermined recommended applications. The at least one application includes a linkage recognition application that can recognize completion of a linkage between the vehicle on-board unit 200 and the mobile device 100. The linkage recognition application receives a video signal from the mobile device 100 and executes linkage or cooperation with the mobile device 100 on condition that the tab launcher application is in an execution status.

The linkage recognition application can transmit information about any of the predetermined recommended applications to the tab launcher application. The linkage recognition application also can update or renew the information about the predetermined recommended applications. The tab launcher application classifies and registers a plurality of applications into corresponding ones of the tabs 120, 130 and 140 based on the information received from the linkage recognition application and information about the predetermined recommended applications stored in the storage unit of the mobile device 100.

The storage unit of the vehicle on-board unit 200 may further store a vehicle travel determination application. The vehicle travel determination application is configured to determine whether or not the vehicle is actually moving or in motion and transmit a determination result to the tab launcher application. Based on the transmitted determination result, the tab launcher application selects a desired tab from among tabs 120, 130 and 140 or switches to a desired tab. These and other applications can be executed by a processing unit such as a CPU of the vehicle on-board unit 200. For example, when the vehicle travel determining application is executed, the processing unit of the vehicle on-board unit 200 operates as the vehicle travel determining section 330 shown in FIG. 2.

The vehicle on-board unit 200 further includes an input unit and a display unit. The input unit and the display unit may be formed by a single touch screen display panel module. The vehicle on-board unit 200 also includes a communication unit, which may be formed by a Bluetooth communication module or a WiFi communication module. The vehicle on-board unit 200 further includes an I/O or interface unit, which may be formed by a USB interface module, a speaker interface module, a microphone interface module, and a parking brake sensor module. The vehicle on-board unit 200 is configured to communicate with a vehicle on-board network such as CAN (Controller Area Network).

As previously described, when the tab launcher application is executed, the processing unit of the mobile device 100 operates as the data control section 310 and the data output section 320 both shown in FIG. 2. When the linkage recognition application is executed, the processing unit of the vehicle on-board unit 200 may operate as a part of the data control section 310 and a part of the data output section 320. Furthermore, when the vehicle travel determining application is executed, the processing unit of the on-board unit 200 operates as the vehicle travel determining section 330 shown in FIG. 2. Additionally, upon execution of the tab launcher application, the processing unit of the mobile device 100 may operate as a part of the vehicle travel determining section 330.

Figure 5:
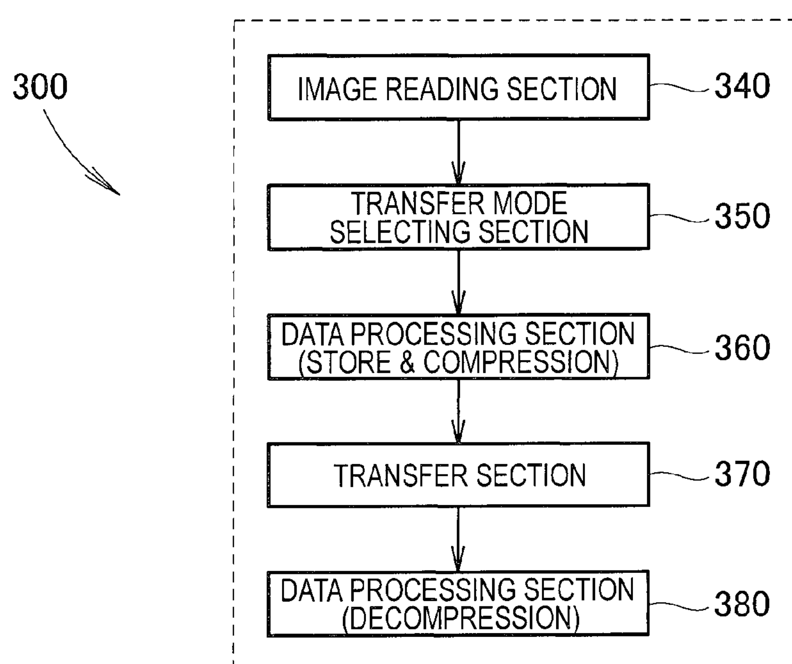
FIG. 5 is a schematic functional block diagram showing functional sections that can be added to the linkage system shown in FIG. 2.

FIG. 5 schematically shows in functional block diagram a contents transfer system according to the present invention. The system shown in FIG. 2 may further equipped with the configuration shown in FIG. 5. Content player applications including the motion picture application 131, TV application 132, music application 133 and photo application 134 can transmit a video signal representing a screen of the display section 110 to the vehicle on-board unit 200 via Bluetooth or WiFi. Other applications than the content player applications can also transmit a video signal via Bluetooth or WiFi.

In the example shown in FIG. 5, the system 300 includes an image data reading section 340, a transfer mode selecting section 350, a data processing section (first data processing section) 360, a transfer section 370, and a data processing section (second data processing section) 380.

The mobile device 100 shown in FIG. 1 can communicate with the Internet via the mobile phone network and downloads or streaming moving image file content data or still image file content data on the Internet.

The image data reading section (content data reading section) 340 shown in FIG. 5 reads a file type or format (file extension, for example) of the downloaded or streamed content data to determine the type of the content data.

Additionally or alternatively, the image data reading section 340 may read a bit rate of the content data so that the type of the content data obtained by the mobile device 100 through downloading or streaming can be determined. Thus, in order to determine the type of content data, the image data reading section (content data reading section) 340 may selectively read only the file format of the content data, only the bit rate of the content data, or both the file format and the bit rate of the content data.

In the case where content data downloaded or streamed by the mobile device 100 has a moving image file type or format, the image data reading section 340 is allowed to read a bit rate of the moving image file content data to determine the type of the content data.

The transfer mode electing section 350 shown in FIG. 5 selects one of two transfer modes based on the result of determination by the image data reading section (content data reading section) 340. If the file format of the content data is a still image file format, the transfer mode selecting section 350 will select a Bluetooth transfer mode rather than a WiFi transfer mode because Bluetooth uses a radio technology called frequency-popping spread spectrum. By thus selecting the transfer mode using the frequency-popping spread spectrum, the transfer mode selecting section 350 can transfer the still image file type content data through a stable channel without deterioration of the data transfer rate. Alternatively, if the file format of the content data is a moving image file type or format, the transfer mode selecting section 350 will select the WiFi transfer mode in which a LAN (Local Area Network) connection is used. By thus selecting the WiFi transfer mode using the LAN connection, the transfer mode selecting section 350 can achieve high-speed transfer of the moving image file type content data.

When content data has a bit rate less than a predetermined bit rate regardless of the file type or format, or alternatively when content data has a moving image file format and the moving image file type content data has a bit rate less than the predetermined bit rate, the transfer mode selecting section 350 may select the Bluetooth transfer mode rather than the WiFi transfer mode. On the other hands, when content data has a bit rate greater than the predetermined bit rate regardless of the file type or format, or alternatively when content data has a moving image file format and the moving image file type content data has a bit rate greater than the predetermined bit rate, the transfer mode selecting section 350 may select the WiFi transfer mode rather than the Bluetooth transfer mode.

The transfer section 370 shown in FIG. 5 may bypass the data processing section 360 and transfer the image data (content data) from the mobile device 100 directly to the on-board unit 200. It is preferable, however, that the image data (content data) is temporarily stored and or compressed by the data processing section 360 before transmission. In both transfer modes (i.e., the Bluetooth transfer mode and the WiFi transfer mode), the actual transfer rate fluctuates by the effect of radio waves. Rather than continuing transmission of the image data (content data) at a constant speed, it is preferable that the image data (content data) is temporarily stored and transmitted while an actual transfer rate is taken into consideration. Furthermore, the image data (content data) is preferably compressed before transmission. By thus processing the image data (content data) by the data processing section 360, highly efficient transfer of the image data (content data) can be achieved.

In case where the image data (content data) has been subjected to compression by the data processing section 360, the data processing section (second data processing section) 380 decompresses the compressed image data (compressed content data) after the compressed image data (compressed content data) is transferred.

In case where the content data has a still image Me type or format, the content player application transmits a video signal forming a screen of the display section 110 to the vehicle on-board unit 200 via SPP of Bluetooth communication, so that the display section 210 can operate as an external monitor. Alternatively, when the content data has a moving image file type or format, it is difficult for the content player application to transfer such moving image file type content data at a relatively low transfer rate as occurring in Bluetooth communication. To avoid this problem, the motion picture application 131 transmits a video signal forming an image on the display section 110 to the vehicle on-board unit 200 via WiFi so that the display section 210 can operate as an external monitor. In case where the motion picture application 131 and/or the other application (content player application) is used to play content data having a bit rate greater than the predetermined bit rate, the content data may be transmitted as a video signal to the vehicle on-board unit 200 via WiFi.

When the moving image application or the like content player application accesses content data having a moving image file format (and/or content data having a bit rate greater than the predetermined bit rate) through the mobile phone network (and the Internet), these content datum including the moving image file type content data can be placed in a playable state after they are downloaded. Stated more specifically, the moving image application or the like content player application suspends or interrupts running of the content data until downloading is completed. During a time when content data having a moving image file format (and/or content data having a bit rate greater than the predetermined bit rate) is downloaded, operation on the touch panel display sections 110 and 210 is disabled. This means that even when a play button is selected by the driver's finger, play of the content data having a moving image file format (and/or the content data having a bit rate greater than the predetermined bit rate) does never occur. When the play button is selected after the downloading of the foregoing content data is completed, the moving image application or the like content player application switches the type of communication from Bluetooth SPP to WiFi and transmits a video signal representing a screen of the display section 110 to the vehicle on-board unit 200 at a high speed via WiFi so that the display section 210 of the vehicle on-board unit 200 can operate as an external monitor.

Switching from Bluetooth to WiFi made for playing content data after completion of the downloading is particularly advantageous when the vehicle on-board unit 200 and the mobile device 100 are linkable together via WiFi using a LAN communication and when the mobile device 100 cannot continue connection with the mobile phone network due to a so-called "tethering restriction" provided under the telecom regulations. Conventionally, the transfer mode which is available while a linkage is completed between a vehicle on-board unit and a mobile device is fixed to Bluetooth or WiFi, such as described at paragraph [0013] of Japanese Patent Application Laid-open Publication (JP-A) No. 2010-199718.

When the moving image application or the like content player application is executed, the processing unit of the mobile device 100 operates as the image data reading section 340, transfer mode selecting section 350, data processing section 360 and transfer section 370 shown in FIG. 5. However, since the linkage recognition application is executed, an arrangement is possible in which the processing unit of the vehicle on-board unit 210 operates as a part of the image data reading section 340, a part of the transfer mode selecting section 350, a part of the data processing section 360, and a part of the transfer section 370. The moving image application 131 of the mobile device 100 may be configured to cooperate with the linkage recognition application of the vehicle on-board unit 200 and/or the tab launcher application of the mobile device 100. When the linkage recognition application is running, the processing unit of the vehicle on-board unit 200 can operate as the data processing section 380 shown in FIG. 5. However, by executing the moving image application and/or the tab launcher application, an arrangement is also possible in which the processing unit of the mobile device 100 operates as a part of the data processing unit 380.

The linkage made between the vehicle on-board unit 200 and the mobile device 100 may be a wireless linkage using a protocol such as Bluetooth or Wifi, or alternately a wired linkage. Furthermore, the vehicle on-board unit 200 and the mobile device 100 may be linked together via a relaying apparatus (not shown), in which instance the vehicle on-board unit 200 and the relaying apparatus may be linked by wire, and the relaying apparatus and the mobile device 100 may be wirelessly linked together.

Furthermore, when an image displayed on the display section 110 of the mobile device 100 is also displayed on the display section 210 of the vehicle on-board unit 200, the OS application of the vehicle on-board unit 200 and any of the applications capable of running on this OS application may operate as a client side of VNC (Virtual Network Computing), while the OS application of the mobile device 100 and any of the applications capable of running on this OS application may operate as a server side of VNC.

Obviously, various minor changes and modifications of the present invention are possible in light of the above teaching. It is therefore to be understood that within the scope of the appended claims the invention may be practiced otherwise than as specifically described.

What is claimed is:

1. A vehicle on-board unit and mobile device linkage system, comprising:

an on-board unit installed in a vehicle, the on-board unit having a display section;

a mobile device having a plurality of application software products registered therein, the mobile device being separate and distinct from the on-board unit and the mobile device having a display section;

a data control section that restricts use of at least one of the plurality of registered application software products;

a data output section that outputs an indication representing the at least one registered application software product to the display section of the on-board unit when the at least one registered application software product is available according to conditions of the vehicle;

a data reading section which determines a type of data to be transferred from the mobile device to the on-board unit;

a transfer mode selecting section which selects one transfer mode from among a plurality of transfer modes based on the result of determination by the data reading section; and a vehicle travel determining section that determines as to whether the vehicle is in motion or in park, wherein said at least one registered application software product includes a first registered application software product which is available while the vehicle is in motion, and a second registered application software product which is available while the vehicle is in park, wherein when the data output section outputs the indication of the at least one registered application software product to the display section of the on-board unit, the data output section automatically switches between a first screen on which the first registered application software product is displayed and a second screen on which the second registered application software product is displayed, based on a determination made by the vehicle travel determining section, wherein the on-board unit having the display section and the mobile device having the display section are capable of being linked with each other, and wherein while the on-board unit and the mobile device are linked together, the linkage system is operable from both of the on-board unit and the mobile device.

2. The vehicle on-board unit and mobile device linkage system according to claim 1, wherein the vehicle travel determining section uses information from a parking brake of the vehicle in order to determine conditions of the vehicle.

3. The vehicle on-board unit and mobile device linkage system according to claim 2, wherein the first registered application software product is an application software product which is capable of recognizing a voice-activation command from a driver of the vehicle.

4. The vehicle on-board unit and mobile device linkage system according to claim 1, wherein the first registered application software product is an application software product which is capable of recognizing a voice-activation command from a driver of the vehicle.

5. The vehicle on-board unit and mobile device linkage system according to claim 1, wherein the mobile device includes a storage unit capable of storing a plurality of application software products, the plurality of application software products storable in the storage unit comprising a cooperative application software product and at least one of the registered application software products, and the data control section determines whether or not each of the plurality of application software products storable in the storage unit corresponds to a predetermined recommended application software product and, on the basis of the result of determination, classifies and registers the plurality of application software products.

* * * * *